(12) United States Patent
Wang et al.

(10) Patent No.: US 10,491,671 B2
(45) Date of Patent: Nov. 26, 2019

(54) METHOD AND APPARATUS FOR SWITCHING BETWEEN SERVERS IN SERVER CLUSTER

(71) Applicant: BEIJING BAIDU NETCOM SCIENCE AND TECHNOLOGY CO., LTD., Beijing (CN)

(72) Inventors: Haifeng Wang, Beijing (CN); Wei He, Beijing (CN); Yu Ma, Beijing (CN); Weide Zhang, Beijing (CN); Zhuo Chen, Beijing (CN); Jingchao Feng, Beijing (CN)

(73) Assignee: Beijing Baidu Netcom Science And Technology Co., Ltd, Beijing (CN)

( * ) Notice: Subject to any disclaimer, the term of this patent is extended or adjusted under 35 U.S.C. 154(b) by 184 days.

(21) Appl. No.: 15/409,753

(22) Filed: Jan. 19, 2017

(65) Prior Publication Data
US 2018/0077230 A1    Mar. 15, 2018

(30) Foreign Application Priority Data

Sep. 14, 2016   (CN) .......................... 2016 1 0827275

(51) Int. Cl.
*G06F 15/173* (2006.01)
*H04L 29/08* (2006.01)
(Continued)

(52) U.S. Cl.
CPC ...... *H04L 67/1029* (2013.01); *H04L 41/0668* (2013.01); *H04L 43/0817* (2013.01);
(Continued)

(58) Field of Classification Search
CPC ............. H04L 67/1029; H04L 41/0668; H04L 43/0817; H04L 43/10; H04L 67/1023; H04L 67/1034; H04L 67/1095
(Continued)

(56) References Cited

U.S. PATENT DOCUMENTS

| | | | | |
|---|---|---|---|---|
| 6,625,750 B1 * | 9/2003 | Duso | .................. | G06F 11/2028 714/11 |
| 2010/0162036 A1 * | 6/2010 | Linden | .................. | G06F 11/181 714/4.11 |

(Continued)

FOREIGN PATENT DOCUMENTS

| | | |
|---|---|---|
| CN | 103580906 A | 2/2014 |
| CN | 103795572 A | 5/2014 |

OTHER PUBLICATIONS

K. Ma and A. Abraham, "Introducing high-consistent large data cache using active-standby failover," 2014 4th World Congress on Information and Communication Technologies (WICT 2014), Bandar Hilir, 2014, pp. 358-362. (Year: 2014).*

(Continued)

*Primary Examiner* — Taylor A Elfervig
(74) *Attorney, Agent, or Firm* — Miller, Matthias & Hull LLP

(57) ABSTRACT

The present application discloses a method and apparatus for switching between servers in a server cluster. The server cluster includes at least one server for implementing a given service. A specific implementation of the method includes: detecting a number of servers in a standby state in the server cluster; starting at least one server in the server cluster so that the number of servers in the standby state reaches a predetermined number, in response to detecting the number of servers in the standby state being less than the predetermined number; monitoring a master server for providing a service in the server cluster; and selecting a server from the servers in the standby state as a master server to continue to provide the service, in response to detecting the master server being abnormal. This implementation solves the data loss problem caused by an abnormal termination or restart of the master server.

17 Claims, 6 Drawing Sheets

(51) Int. Cl.
*H04L 12/26* (2006.01)
*H04L 12/24* (2006.01)

(52) U.S. Cl.
CPC .......... *H04L 43/10* (2013.01); *H04L 67/1023* (2013.01); *H04L 67/1034* (2013.01); *H04L 67/1095* (2013.01)

(58) Field of Classification Search
USPC ........................................................ 709/226
See application file for complete search history.

(56) References Cited

U.S. PATENT DOCUMENTS

2012/0173919 A1* 7/2012 Patel .................. G06F 11/1453
714/4.11
2015/0180719 A1* 6/2015 Wu ..................... H04L 41/0896
709/224

OTHER PUBLICATIONS

D. Singh, J. Singh and A. Chhabra, "High Availability of Clouds: Failover Strategies for Cloud Computing Using Integrated Checkpointing Algorithms," 2012 International Conference on Communication Systems and Network Technologies, Rajkot, 2012, pp. 698-703. (Year: 2012).*

V. R. Yerravalli and A. Tharigonda, "High Availability Cluster Failover Mechanism Using Artificial Neural Networks," 2015 IEEE International Conference on Cloud Computing in Emerging Markets (CCEM), Bangalore, 2015, pp. 81-84. (Year: 2015).*

Chinese Office Action for Chinese Priority Application No. 201610827275.1; Office Action dated Aug. 17, 2018.

* cited by examiner

METHOD AND APPARATUS FOR SWITCHING BETWEEN SERVERS IN SERVER CLUSTER

CROSS-REFERENCE TO RELATED APPLICATION

This application is related to and claims priority from Chinese Application No. 201610827275.1, filed on Sep. 14, 2016, the entire disclosure of which is hereby incorporated by reference.

TECHNICAL FIELD

The present application relates to the field of computer technology, specifically to the field of Internet technology, and more specifically to a method and apparatus for switching between servers in a server cluster.

BACKGROUND

Currently, a control system with relatively high security and stability requirement is equipped with more than one servers or controllers. The servers or controllers in the system mostly employ a standby redundancy, or restart the servers or controllers that abnormally quit to solve the security and stability problem in the system. However, in the standby redundancy mode, if both the master machine and the standby machine fail, the system will be out of control, leading to poor security and stability of the system. The approach to restart a controller that abnormally quits will cause data loss of the control master machine and the control node after an abnormal system quit resulting in the system unable to operate normally after the system restarts.

SUMMARY

An objective of the present application is to provide an improved method and apparatus for switching between servers in a server cluster, so as to solve the technical problem mentioned in the Background section.

According to a first aspect, the present application provides a method for switching between servers in a server cluster, the server cluster comprising at least one server for implementing a given service, the method comprising: detecting a number of servers in a standby state in the server cluster; starting at least one server in the server cluster so that the number of servers in the standby state reaches a predetermined number, in response to detecting the number of servers in the standby state being less than the predetermined number; monitoring a master server for providing a service in the server cluster; and selecting a server from the servers in the standby state as a second master server to continue to provide the service, in response to detecting the master server being abnormal.

In some embodiments, the detecting a number of servers in a standby state in the server cluster comprises: acquiring status information of each server in the server cluster; determining whether each server is in the standby state according to the status information of each server; and counting and determining the number of servers in the standby state.

In some embodiments, the status information comprises heartbeat information; and the determining whether each server is in the standby state according to the status information of each server comprises: sending a heartbeat information detection instruction to each server in the server cluster; and determining whether a server is in the standby state, according to whether heartbeat information of the server is received within a preset period.

In some embodiments, the starting at least one server in the server cluster so that the number of servers in the standby state reaches a predetermined number, in response to detecting the number of servers in the standby state being less than the predetermined number comprises: starting at least one server in the server cluster according to a difference between the number of servers in the standby state and the predetermined number so that the number of servers in the standby state in the server cluster is equal to the predetermined number; acquiring information of each server in the at least one server; and sequentially registering the information of each started server as registration information of the server in a preset registration information table.

In some embodiments, the selecting a server from the servers in the standby state as a second master server to continue to provide the service, in response to detecting the master server being abnormal comprises: extracting the registration information of the servers in the standby state from the registration information table, the registration information comprising serial number information of the servers in the standby state; and selecting one server from the servers in the standby state as the second master server to continue to provide the service according to values of serial numbers in the serial number information.

In some embodiments, the selecting one server from the servers in the standby state as the second master server to continue to provide the service comprises: establishing communication connection from the selected server to a preset data storage area; backing up data in the preset data storage area to the selected server; establishing communication connection from the selected server to a service node, the service node being a device interacting with the master server and controlled by the master server; and using the selected server as the second master server to continue to provide the service.

According to a second aspect, the present application provides an apparatus for switching between servers in a server cluster, the server cluster comprising at least one server for implementing a given service, the apparatus comprising: a detection unit configured to detect a number of servers in a standby state in the server cluster; a starting unit configured to start at least one server in the server cluster so that the number of servers in the standby state reaches a predetermined number, in response to detecting the number of servers in the standby state being less than the predetermined number; a monitoring unit configured to monitor a master server for providing a service in the server cluster; and a switching unit configured to select a server from the servers in the standby state as a second master server to continue to provide the service, in response to detecting the master server being abnormal.

In some embodiments, the detection unit comprises: an acquiring module configured to acquire status information of each server in the server cluster; a judging module configured to determine whether the each server is in the standby state based on the status information of the each server; and a determining module configured to count and determine the number of servers in the standby state.

In some embodiments, the status information comprises heartbeat information; and the judging module is further configured to: send a heartbeat information detection instruction to the each server in the server cluster; and determine whether the each server is in the standby state, based on receipt of the heartbeat information from the server within a preset period.

In some embodiments, the starting unit is further configured to: start the at least one server in the server cluster based on a difference between the number of servers in the standby state and the predetermined number so that the number of servers in the standby state in the server cluster is equal to the predetermined number; acquire information of each server in the at least one server; and sequentially register information of each started server as registration information of the each started server in a preset registration information table.

In some embodiments, the switching unit is further configured to: extract the registration information of the servers in the standby state from the registration information table, the registration information comprising serial number information of the servers in the standby state; and select one server from the servers in the standby state as the second master server to continue to provide the service according to values of serial numbers in the serial number information.

In some embodiments, the switching unit comprises: a first communication connection module configured to establish communication connection from the selected server to a preset data storage area; a data reading module configured to back up data in the preset data storage area to the selected server; a second communication connection module configured to establish communication connection from the selected server to a service node, the service node being a device interacting with the master server and controlled by the master server; and a switching service module configured to use the selected server as the second master server to continue to provide the service.

According to the method and apparatus for switching between servers in a server cluster that are provided in the present application, it is determined whether a master server is abnormal by determining the status of each server in a server cluster; if the master server is abnormal, a new master server is selected from servers in normal in the server cluster to replace the abnormal master server, and data backed up in a preset data storage area is downloaded from the data storage area, so that data of the new master server is recovered into data of the replaced master server in normal state, thereby solving the data loss problem of the master server caused by an abnormal termination or restart of the master server during system running.

BRIEF DESCRIPTION OF THE DRAWINGS

After reading detailed descriptions of non-limiting embodiments with reference to the following accompanying drawings, other features, objectives and advantages of the present application will be more apparent.

DETAILED DESCRIPTION OF EMBODIMENTS

The present application is further described in detail through the accompanying drawing and the embodiment. It should be understood that, the specific embodiments described herein are merely used to explain the relevant invention, and are not intended to limit the present invention. In addition, it should be further noted that, in order to facilitate the description, merely the parts related to the relevant invention are shown in the accompanying drawings.

It should be noted that, the embodiments of the present application and features in the embodiments may be combined on a non-conflict basis. The present application will be described in detail through the accompanying drawings and the embodiments.

Figure 1:
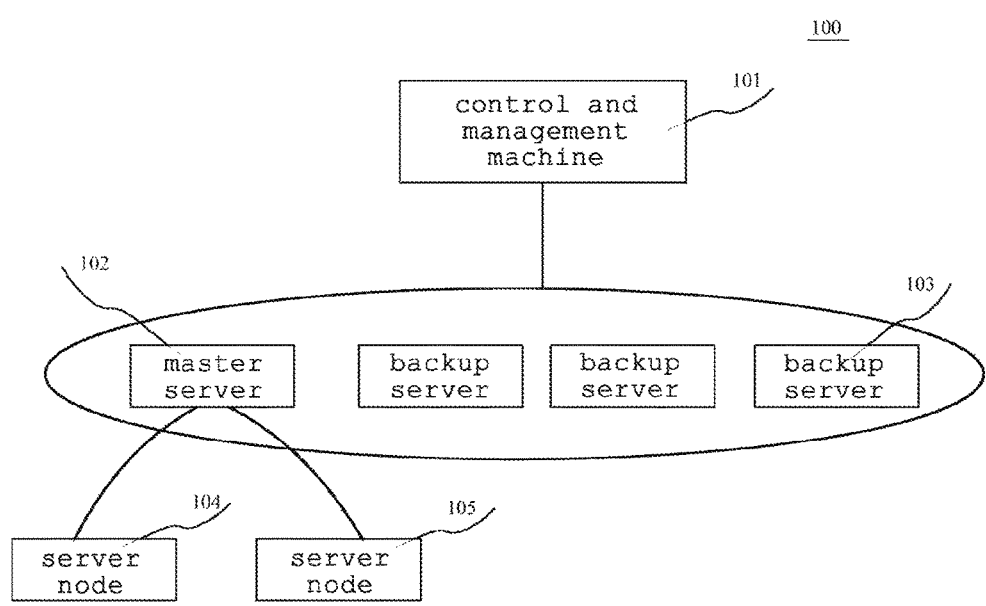
FIG. 1 is a diagram illustrating an exemplary system architecture to which the present application can be applied.

FIG. 1 shows an exemplary system architecture 100 to which a method for switching between servers in a server cluster or an apparatus for switching between servers in a server cluster according to an embodiment of the present application can be applied.

As shown in FIG. 1, the system architecture 100 may include a management and control machine 101, a master server 102, backup servers 103, a service node 104, and a service node 105.

The management and control machine 101 may be a server providing management and control services, and for example, tests the statuses of the master server 102, the backup servers 103, the service node 104, and the service node 105, switches the master server according to the test result, and updates data of the master server 102, the backup servers 103, the service node 104, and the service node 105.

The service node 104 and the service node 105 are control nodes at the bottom layer of the system, and implement a specific control service. For example, the service node 104 and the service node 105 may be processing program nodes for acquiring data of a sensor, or may be perceptual computing program nodes.

The master server 102 is used to connect the management control apparatus 101 with the service node 104 and the service node 105, and controls to the service node 104 and the service node 105.

The backup server 103 serves as a backup apparatus to the master server 102. The backup server 103 is in a standby mode when the master server 102 operates normally. When a problem such as failure or abnormity arises in the master server, one server may be automatically selected from the backup servers as a new master server to replace the original master server.

It should be noted that the method for switching between servers in a server cluster provided in this embodiment of the present application is generally implemented by the management and control machine 101. Correspondingly, an apparatus for switching between servers in a server cluster is generally disposed in the management and control machine 101.

It should be understood that the number of the management and control apparatus, the master server, the backup server and the service node is merely schematic. Depending on the actual requirement, there may be any number of management and control apparatus, master servers, backup servers and service nodes.

Figure 2:
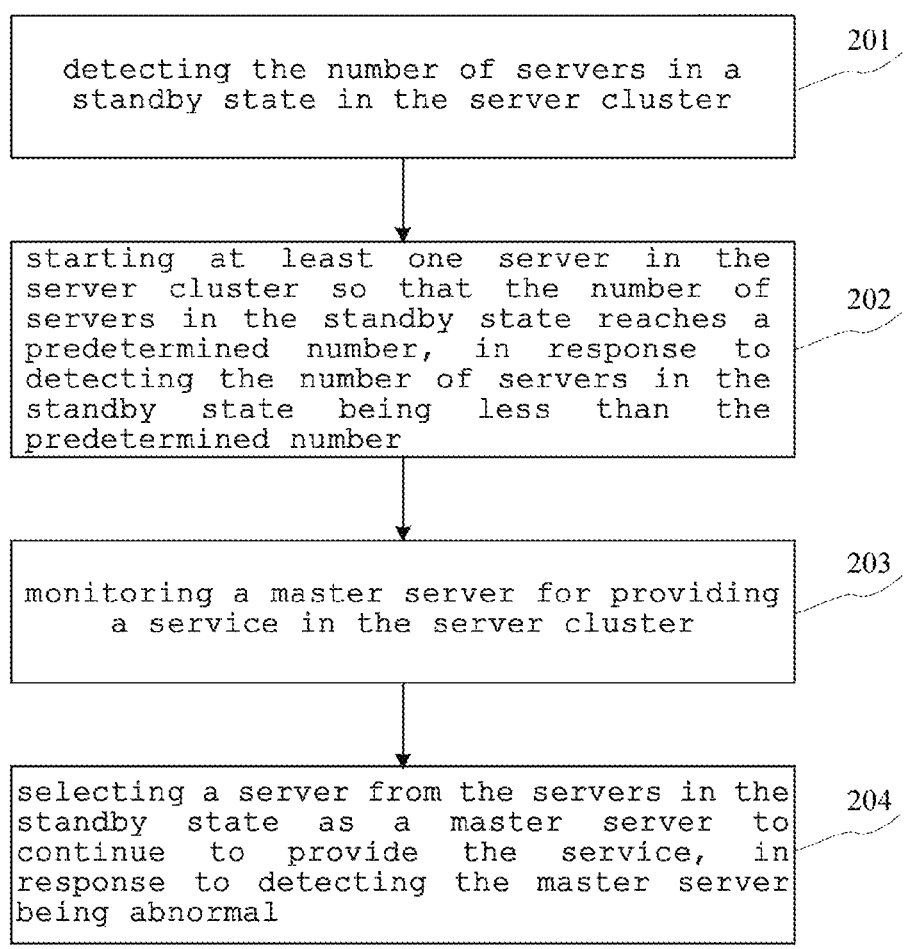
FIG. 2 is a flow chart of a method for switching between servers in a server cluster according to an embodiment of the present application.

Further, referring to FIG. 2, it shows a flowchart 200 of a method for switching between servers in a server cluster according to an embodiment of the present application. The method for switching between servers in a server cluster includes the following steps.

Step 201, detecting the number of servers in a standby state in the server cluster.

In this embodiment, an electronic device (for example, the management and control machine shown in FIG. 1) on which the method for switching between servers in a server cluster runs may communicate with or exchange data with the master server, the backup server, or the service node by means of a wired connection or a wireless connection. The electronic device acquires, from a server cluster connected thereto, information of each server in the server cluster, and determines the number of servers in the standby state. The server cluster includes at least one server used for implementing a given service. Herein, the given service refers to that in a system including the management and control machine, servers, and service nodes, the servers exchange information with the management and control machine and service nodes. For example, the server acquires information of the service nodes, acquires an instruction from the management and control machine, is controlled by the management and control machine, and controls and manages the service nodes.

Generally, servers in the server cluster include a master server and a backup server. The master server is in communication connection with and can exchange data with the management and control machine and the service node. As a standby for the master server, the backup server is synchronized with the master server. When the master server fails or is abnormally terminated, the backup server replaces the master server to provide a service. The detecting the number of servers in a standby state in the server cluster may be implemented by detecting status information of the servers by using a sensor and obtaining statuses of the servers according to the status information of the servers, or may be implemented by obtaining statuses of the servers by detecting server ports. The number of servers in the standby state in the server cluster is counted and determined according to the status of each server in the server cluster. When detecting the number of servers in the standby state in the server cluster, the above-mentioned electronic device may initiate a request for detecting the number of servers in the standby state in the server cluster, for example, periodically initiate a detection request to obtain the number of servers in the standby state, or initiate a detection request by polling to obtain the number of servers in the standby state. Alternatively, the servers in the server cluster may actively inform the electronic device of the number of servers in the standby state in an interrupted approach when a server in the server cluster fails or is abnormally terminated.

In some alternative implementations of this embodiment, the detecting a number of servers in a standby state in the server cluster comprises: acquiring status information of each server in the server cluster; determining whether each server is in the standby state according to the status information of each server; and counting and determining the number of servers in the standby state. When the above-mentioned electronic device is to acquire the status information of each server in the server cluster, the electronic device may initiate a request for acquiring the status information of each server in the server cluster, for example, periodically initiate an acquiring request to obtain the status information of each server in the server cluster, or initiate an acquiring request by polling to obtain the status information of each server in the server cluster. Alternatively, the servers in the server cluster may actively inform the electronic device of the status information of each server in the server cluster in an interrupted approach when the servers in the server cluster fail or is abnormally terminated. It is determined, according to the status information of each server that is acquired by the electronic device, whether each server is in the standby state. Then, the number of servers in the standby state is counted and determined.

In some alternative implementations of this embodiment, the determining whether each server is in the standby state according to the status information of each server comprises: sending a heartbeat information detection instruction to each server in the server cluster; and determining whether a server is in the standby state, according to whether heartbeat information of the server is received within a preset period. The determining whether the server is in normal is specifically: sending a heartbeat information detection instruction to the server, and determining whether the server is in normal by determining whether heartbeat information is returned from the server within a specified period, wherein if yes, the server is in normal and is in the standby state. Alternatively, a heartbeat packet may be directly sent to the server, and if a heartbeat packet is returned from the server within a specified period, the server is in normal and is in the standby state.

Step 202, starting at least one server in the server cluster so that the number of servers in the standby state reaches a predetermined number, in response to detecting the number of servers in the standby state being less than the predetermined number.

In this embodiment, the number of servers in the standby state detected in the above-mentioned step 201 is compared with a predetermined number. Herein, the predetermined number is a number that is set in advance, and is a natural number. The predetermined number may be set according to the number of master servers providing a service and the number of backup servers in the server cluster. Herein, if the number of servers in the standby state in the server cluster is less than the predetermined number, there is at least one abnormal or failed server in the server cluster. To ensure that a master server that fails or is abnormally terminated can be replaced in time, it needs to be ensured that the number of servers in the standby state is equal to the predetermined number. At least one server in the server cluster is started, so that the started server is in the standby state, and can provide the service when the master server is abnormal or is terminated.

Step 203, monitoring a master server for providing a service in the server cluster.

In this embodiment, the master server used to provide the service in the server cluster is monitored. The master server used to provide the service may be set in advance, or may be a server selected from the servers in the standby state in the server cluster according to a certain rule. The status of the master server is monitored by acquiring the status information of the master server.

Step 204, selecting a server from the servers in the standby state as a master server to continue to provide the service, in response to detecting the master server being abnormal.

In this embodiment, based on the result of monitoring the master server in step 203, the electronic device, when detecting that the master server is abnormal, selects a server from the servers in the standby state as a master server to continue to provide the service. Herein, the abnormality of the master server includes anyone of the following: the quit of the master server, the abnormal communication between the master server and the management and control machine, and the crash of the master server. Herein, the selecting a server from the servers in the standby state as a master server to continue to provide the service may include: obtaining backup data of the master server, and recovering data of the master server after switching to data in the normal state. The backup data is operation data and status data before the master server becomes abnormal.

Figure 3:
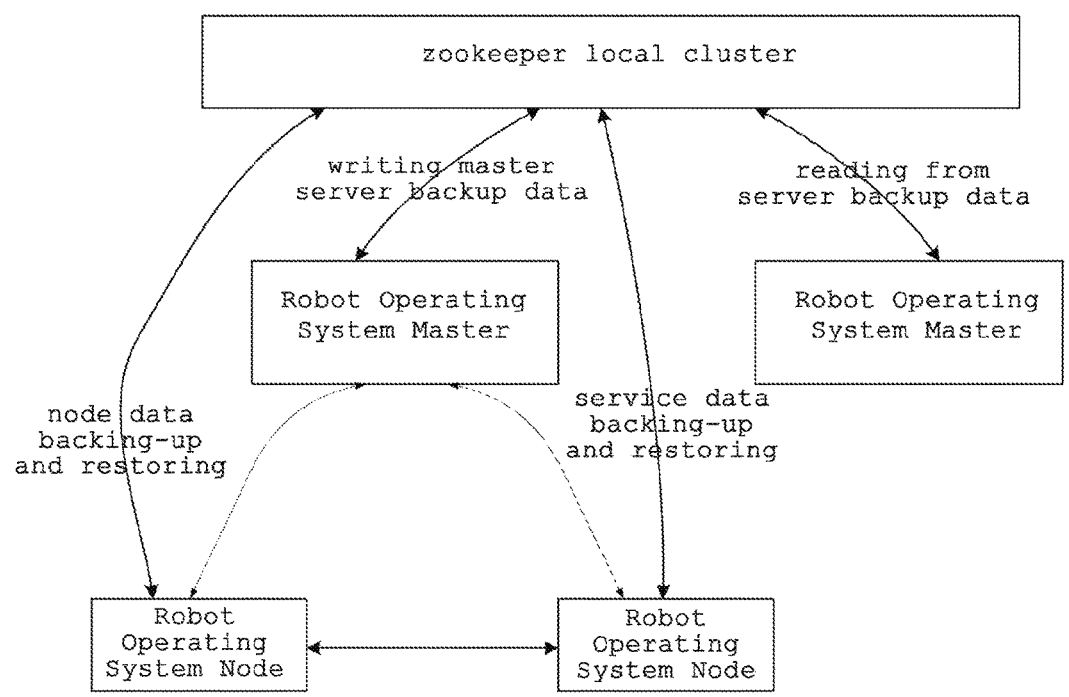
FIG. 3 is a schematic diagram of an application scenario of a method for switching between servers in a server cluster according to the present application.

Further, referring to FIG. 3, it is a schematic diagram of an application scenario of the method for switching between servers in a server cluster according to this embodiment. In the application scenario of FIG. 3, the above-mentioned electronic device (the management and control machine in FIG. 1) may be a zookeeper local cluster connected to servers in the system. Herein, the servers are robot operating system (ROS) masters, including a master ROS Master and a slave ROS Master. The master ROS Master provides a service, controls a detection device, a control device or a communication device connected thereto, and backs up data to a preset data storage area in the zookeeper local cluster. As a standby device for the master ROS Master, the slave ROS Master is synchronized with the master ROS Master, and reads the backup data from the preset data storage area in the zookeeper local cluster. The electronic device determines whether the status of the ROS Masters is normal so as to acquire the number of servers in the standby state (that is, normal servers) in the server cluster, and compares the number with a predetermined number that is set in advance. Herein, if the number of normal servers in the server cluster is less than the predetermined number, there is an abnormal or failed ROS Master in the server cluster, and an ROS Master needs to be started as a standby. The electronic device starts at least one ROS Master, so that the number of ROS Masters in the standby state (that is, can be normally used) in the server cluster is equal to the predetermined number. Then, the electronic device selects, from the ROS Masters in the standby state, an ROS Master having the smallest serial number as the master ROS Master. The selected master ROS Master downloads the backup data from the preset data storage area, so that data of the master ROS Master is recovered to data of the normal state. The selected master ROS Master is used to replace the abnormal or failed master ROS Master. FIG. 3 also shows robot operating system service nodes (ROS Nods). The ROS Nods may be service nodes in the ROS system, and may be a detection device, a control device or a communication device connected to the master ROS Master.

The method provided in the embodiment of the present application solves the data loss problem of the master server caused by an abnormal termination or restart during system running by determining whether the master server in the server cluster is abnormal, and if yes, selecting a master server from servers in the standby state in the server cluster to replace the abnormal master server.

Figure 4:
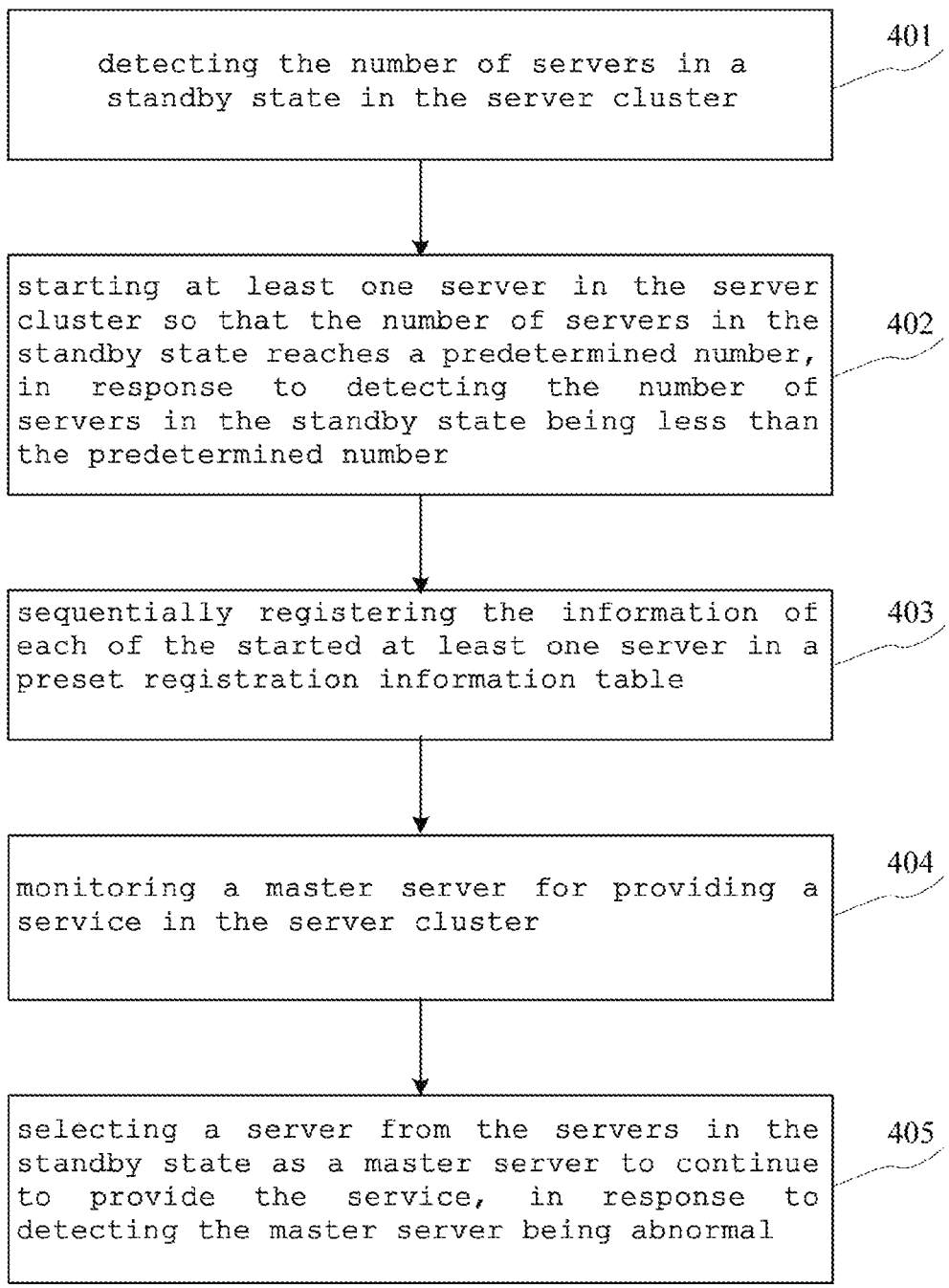
FIG. 4 is a flowchart of a method for switching between servers in a server cluster according to another embodiment of the present application.

Further, referring to FIG. 4, it shows a flowchart 400 of a method for switching between servers in a server cluster according to another embodiment. The flowchart 400 of the method for switching between servers in a server cluster includes the following steps.

Step 401, detecting the number of servers in a standby state in the server cluster.

In this embodiment, an electronic device (for example, the management and control machine shown in FIG. 1) on which the method for switching between servers in a server cluster runs may communicate with or exchange data with the master server, the backup server, or the service node by means of a wired connection or a wireless connection. The electronic device acquires, from a server cluster connected thereto, information of each server in the server cluster, and determines the number of servers in the standby state. The server cluster includes at least one server used for implementing a given service.

Step 402, starting at least one server in the server cluster so that the number of servers in the standby state reaches a predetermined number, in response to detecting the number of servers in the standby state being less than the predetermined number.

In this embodiment, the number of servers in the standby state detected in the above-mentioned step 401 is compared with a predetermined number. Herein, the predetermined number is a number that is set in advance, and is a natural number. Herein, if the number of servers in the standby state in the server cluster is less than the predetermined number, there is at least one abnormal or failed server in the server cluster. To ensure that a master server that fails or is abnormally terminated can be replaced in time, it needs to be ensured that the number of servers in the standby state is equal to the predetermined number. When the at least one server is started, the number of servers to be started may be determined according to the difference between the number of servers in the standby state and the predetermined number.

Step 403, sequentially registering the information of each started server as registration information of the server in a preset registration information table.

In this embodiment, based on the at least one server started in the server cluster in the step 402, the number of servers in the standby state in the server cluster is equal to the predetermined number. After a server is started, the server enters the standby state, and information about the server is acquired. Information about each of the above-mentioned at least one server is sequentially registered in a registration information table preset in a storage area of the above-mentioned electronic device, and the registered information is used as registration information of the server. The preset registration information table is a registration table that is set in advance to identify distinguishing information of each server in the server cluster. The information about each server in the registration information table includes: information that can identify the server, such as serial number information, address information, port information, communication link information, Transmission Control Protocol (TCP), User Datagram Protocol (UDP), input, output, and so on.

Step 404, monitoring a master server for providing a service in the server cluster.

In this embodiment, the master server used to provide the service in the server cluster is monitored. The master server used to provide the service may be set in advance, or may be a server selected from the servers in the standby state in the server cluster according to a certain rule. The status of the master server is monitored by acquiring the status information of the master server.

Step 405, selecting a server from the servers in the standby state as a master server to continue to provide the service, in response to detecting the master server being abnormal.

In this embodiment, based on the result of monitoring the master server in step 404, the electronic device, when detecting that the master server is abnormal, selects a server from the servers in the standby state as a master server to continue to provide the service. Herein, the abnormality of the master server includes anyone of the following: the quit of the master server, the abnormal communication between the master server and the management and control machine, and the crash of the master server.

In some alternative implementations of this embodiment, the selecting a server from the servers in the standby state as a master server to continue to provide the service, in response to detecting the master server being abnormal comprises: extracting the registration information of the servers in the standby state from the registration information table, the registration information comprising serial number information of the servers in the standby state; and selecting one server from the servers in the standby state as the master server to continue to provide the service according to values of serial numbers in the serial number information. For example, a server having the smallest serial number may be determined as the standby master server. Herein, when detecting that the master server in service is abnormal, the above-mentioned electronic device sequentially acquires the serial number information of the servers in the server cluster, and selects a server from the servers in the standby state as a standby master server according to the serial number information.

In some alternative implementations of this embodiment, the selecting one server from the servers in the standby state as the master server to continue to provide the service comprises: establishing communication connection from the selected server to a preset data storage area; backing up data in the preset data storage area to the selected server; establishing communication connection from the selected server to a service node, the service node being a device interacting with the master server and controlled by the master server; and using the selected server as a master server to continue to provide the service. Herein, the above-mentioned electronic device sets a data storage area in advance, and backs up data related to the master server to the data storage area. The data related to the master server may be status data of the master server itself, data acquired by the master server by interacting with a device communicatively connected thereto, or data obtained by the master server after an operation; or may be data of a device communicatively connected to the master server, or data obtained by the device after an operation. The electronic device downloads the data related to the master server that is backed up in the preset data storage area into the selected server, so that the selected server reads the backup data, and recovers the normal state of the replaced master server at the moment before entering the failed or abnormal state. Then, the selected server is used as a master server of the server cluster to provide the service. Herein, using the selected server as a master server of the server cluster to provide the service is to switch the above-mentioned master server, and the selected server is used as a master server to replace the above-mentioned abnormal or failed master server to provide the service. Establishing a communication connection between the master server and the preset data storage area and the service nodes may refer to that the master server exchanges information with the preset data storage area or the service nodes by means of a network or any other type of connection.

As can be seen from FIG. 4, compared with the embodiment corresponding to FIG. 2, the flowchart 400 of the method for switching between servers in a server cluster in this embodiment highlights the registration of the information about the started server. Therefore, the solution provided in this embodiment can switch or restart a failed server and service node devices connected to the servers according to the registration information, thereby improving the security and reliability of the system including the server cluster and service nodes.

Figure 5:
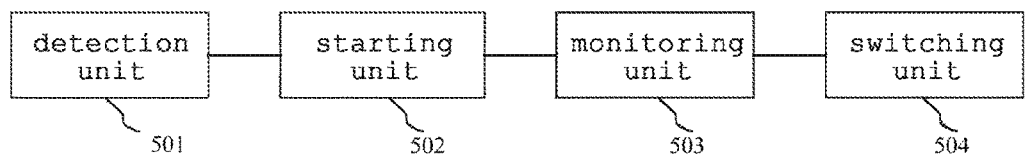
FIG. 5 is a schematic structural diagram of an apparatus for switching between servers in a server cluster according to an embodiment of the present application.

Further, referring to FIG. 5, as an implementation of the methods shown in the above-mentioned figures, the present application provides an embodiment of an apparatus for switching between servers in a server cluster. This apparatus embodiment corresponds to the method embodiment shown in FIG. 2. The apparatus may be specifically applied to various electronic devices.

As shown in FIG. 5, the apparatus 500 for switching between servers in a server cluster of this embodiment includes: a detection unit 501, a starting unit 502, a monitoring unit 503, and a switching unit 504. The server cluster includes at least one server for implementing a given service. The detection unit 501 is configured to detect a number of servers in a standby state in the server cluster. The starting unit 502 is configured to start at least one server in the server cluster so that the number of servers in the standby state reaches a predetermined number, in response to detecting the number of servers in the standby state being less than the predetermined number. The monitoring unit 503 is configured to monitor a master server for providing a service in the server cluster. The switching unit 504 is configured to select a server from the servers in the standby state as a master server to continue to provide the service, in response to detecting the master server being abnormal.

In this embodiment, the detection unit 501 in the apparatus 500 for switching between servers in a server cluster acquires, from a server cluster connected thereto, status information of each server in the server cluster, and determines the number of servers in the standby state.

In this embodiment, the number of servers in the standby state that is detected by the detection unit 501 is compared with a predetermined number. Herein, the predetermined number is a number that is set in advance, and is natural number. The predetermined number may be set according to the number of master servers providing the service and the number of backup servers in the server cluster. Herein, when the number of servers in the standby state in the server cluster is less than the predetermined number, the starting unit 502 starts at least one server, so that the number of servers in the standby state is equal to the predetermined number.

In this embodiment, the monitoring unit 503 monitors a master server used to provide the service in the server cluster. The master server used to provide the service may be set in advance, or may be a server selected from the servers in the standby state in the server cluster according to a certain rule. The status of the master server is monitored by acquiring the status information of the master server.

In this embodiment, based on the result of monitoring the master server by the monitoring unit 503, the monitoring unit 503, when detecting that the master server is abnormal, selects a server from the servers in the standby state as a master server to continue to provide the service. Herein, the abnormality of the master server includes any one of the following: the quit of the master server, the abnormal communication between the master server and the management and control machine, and the crash of the master server.

In some alternative implementations of this embodiment, the detection unit 501 includes: an acquiring module, a judging module, and a determining module. The acquiring module is configured to acquire status information of each server in the server cluster. The judging module is configured to determine whether each server is in the standby state according to the status information of each server. The determining module is configured to count and determine the number of servers in the standby state. When the acquiring module is to acquire the status information of each server in the server cluster, the acquiring module may initiate a request for acquiring the status information of each server in the server cluster, for example, periodically initiate an acquiring request to obtain the status information of each server in the server cluster, or initiate an acquiring request by polling to obtain the status information of each server in the server cluster. Alternatively, the servers in the server cluster may actively inform the acquiring module of the status information of each server in the server cluster in an interrupted approach when the servers in the server cluster fail or is abnormally terminated.

In some alternative implementations of this embodiment, the above-mentioned judging module is further configured to: send a heartbeat information detection instruction to each server in the server cluster; and determine whether a server is in the standby state, according to whether heartbeat information of the server is received within a preset period. The status information acquired by the acquiring module includes heartbeat information. A heartbeat packet may be sent to the server, and if a heartbeat packet is returned from the server within a specified period, the server is in normal and is in the standby state.

In some alternative implementations of this embodiment, the starting unit is further configured to: start at least one server in the server cluster according to a difference between the number of servers in the standby state and the predetermined number so that the number of servers in the standby state in the server cluster is equal to the predetermined number; acquire information of each server in the at least one started server; and sequentially register the information of each started server as registration information of the server in a preset registration information table. The preset registration information table is a registration table that is set in advance to identify distinguishing information of each server in the server cluster. The information about each server in the registration information table includes: information that can identify the server, such as serial number information, address information, port information, communication link information, Transmission Control Protocol (TCP), User Datagram Protocol (UDP), input, output, and so on.

In some alternative implementations of this embodiment, the switching unit 504 is further configured to: extract the registration information of the servers in the standby state from the registration information table, the registration information comprising serial number information of the servers in the standby state; and select one server from the servers in the standby state as the master server to continue to provide the service according to values of serial numbers in the serial number information.

In some alternative implementations of this embodiment, the switching unit 504 includes: a first communication connection module, a data reading module, a second communication connection module, and a switching service module. The first communication connection module is configured to establish communication connection from the selected server to a preset data storage area. The data reading module is configured to back up data in the preset data storage area to the selected server. The second communication connection module is configured to establish communication connection from the selected server to a service node, the service node being a device interacting with the master server and controlled by the master server. The switching service module is configured to use the selected server as a master server to continue to provide the service. The electronic device may set a data storage area in advance, and back up data related to the master server to the data storage area. The data related to the master server may be status data of the master server itself, data acquired by the master server by interacting with a device communicatively connected thereto, or data obtained by the master server after an operation; or may be data of a device communicatively connected to the master server, or data obtained by the device after an operation. Establishing a communication connection between the master server and the preset data storage area and the service nodes may refer to that the master server exchanges information with the preset data storage area or the service nodes by means of a network or any other type of connection.

The apparatus provided in the embodiment of the present application solves the data loss problem of the master server caused by an abnormal termination or restart during system running by judging the number of the servers in normal in the server cluster to determine whether the master server is abnormal, and if yes, selecting a master server from servers in the standby state in the server cluster to replace the abnormal master server.

Figure 6:
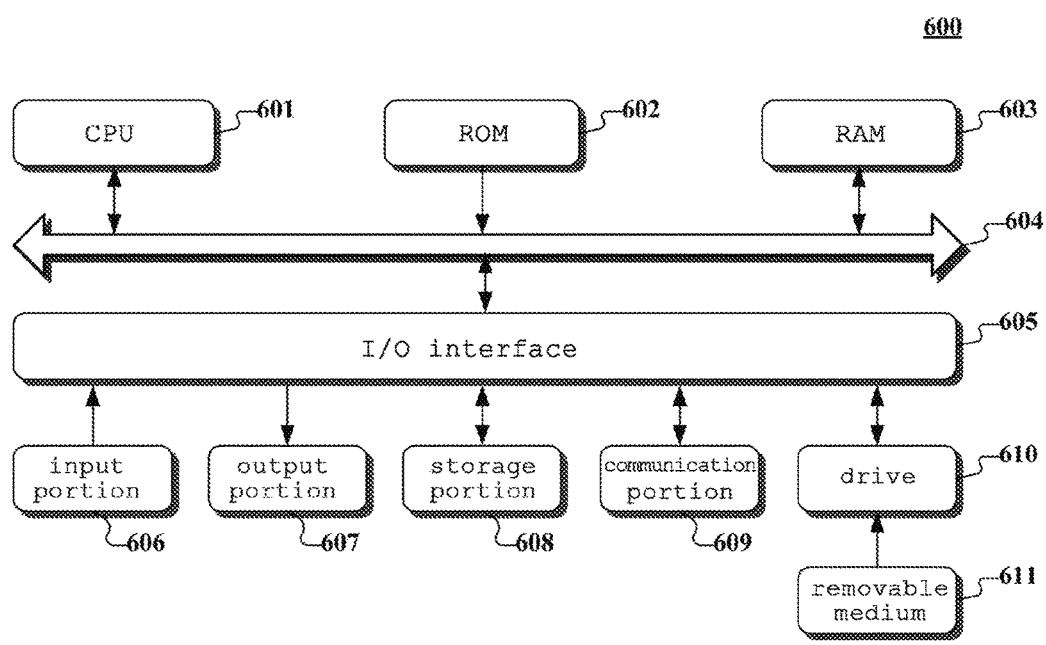
FIG. 6 is a schematic structural diagram of a computer system adapted to implement a management and control machine according to an embodiment of the present application.

Referring to FIG. 6, a schematic structural diagram of a computer system 600 adapted to implement a terminal apparatus of the embodiments of the present application is shown.

As shown in FIG. 6, the computer system X00 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to FIG. 2 may be implemented in a computer software program. For example, an embodiment of the present disclosure includes a computer program product, which comprises a computer program that is tangibly embedded in a machine-readable medium. The computer program comprises program codes for executing the method of FIG. 2. In such an embodiment, the computer program may be downloaded and installed from a network via the communication portion 609, and/or may be installed from the removable media 611.

The flowcharts and block diagrams in the figures illustrate architectures, functions and operations that may be implemented according to the system, the method and the computer program product of the various embodiments of the present invention. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a detection unit, a starting unit, a monitoring unit and a switching unit, where the names of these units or modules are not considered as a limitation to the units or modules. For example, the detection unit may also be described as "a unit for detecting a number of servers in a standby state in the server cluster".

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. The programs are used by one or more processors to: detect a number of servers in a standby state in the server cluster; start at least one server in the server cluster so that the number of servers in the standby state reaches a predetermined number, in response to detecting the number of servers in the standby state being less than the predetermined number; monitor a master server for providing a service in the server cluster; and select a server from the servers in the standby state as a master server to continue to provide the service, in response to detecting the master server being abnormal.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for switching between servers in a server cluster, the server cluster comprising at least one server for implementing a given service, the method comprising:
   detecting a number of servers in a standby state in the server cluster;
   starting at least one server in the server cluster so that the number of servers in the standby state reaches a predetermined number, in response to detecting the number of servers the standby state being less than the predetermined number;
   backing up backup data of a master server to a preset data storage area, wherein the backup data comprises operation data and status data of the master server;
   monitoring the master server for providing a service in the server cluster; and
   selecting a server from the servers in the standby state as a second master server, establishing communication connection from the selected server to the preset data storage area, and backing up the backup data of the master server in the preset data storage, area to the selected server, for the selected server to continue to provide the service, in response to detecting the master server being abnormal,
   wherein the selecting a server from the servers in the standby state as a second master server to continue to provide the service, in response to detecting the master server being abnormal comprises:
   extracting registration information of the servers in the standby state from a registration information table, the registration information comprising serial number information of the servers in the standby state; and
   selecting one server from the servers in the standby state as the second master server to continue to provide the service according to values of serial numbers in the serial number information.

2. The method according to claim 1, wherein the detecting a number of servers in a standby state in the server cluster comprises:
   acquiring status information of each server in the server cluster;
   determining whether each server is in the standby state according to the status information of each server; and
   counting and determining the number of servers in the standby state.

3. The method according to claim 2, wherein the status information comprises heartbeat information; and
   the determining whether each server is in the standby state according to the status information of each server comprises:
   sending a heartbeat information detection instruction to each server in the server cluster; and
   determining whether a server is in the standby state, according to whether heartbeat information of the server is received within a preset period.

4. The method according to claim 1, wherein the starting at least one server in the server cluster so that the number of servers in the standby state reaches a predetermined number, in response to detecting the number of servers in the standby state being less than, the predetermined number comprises:
   starting at least one server in the server cluster according to a difference between the number of servers in the standby state and the predetermined number so that the number of servers in the standby state in the server cluster is equal to the predetermined number;
   acquiring information of each server in the at least one server; and
   sequentially registering the information of each started server as the registration information of the server in a preset registration information table.

5. The method according to claim 1, wherein the selecting one server from the servers in the standby state as the second master server to continue to provide the service further comprises:

establishing communication connection from the selected server service node, the service node being, a device interacting with the master server and controlled by the master server; and using the selected server as the second master server to continue to provide the service.

6. The method according to claim 1, wherein the preset data storage area is set in a zookeeper local cluster connected to the servers in the system.

7. The method according to chain 1, wherein the predetermined number is larger than two.

8. An apparatus for switching between servers in a server cluster, the server cluster comprising at least one server for implementing a given service, the apparatus comprising:

at least one processor; and a memory storing instructions, the instructions when executed by the at least one processor, cause the at least one processor to perform operations, the operations comprising:

detecting a number of servers in a standby state in the server cluster;

starting at least one server in the server cluster so that the number of servers in the standby state reaches a predetermined number, in response to detecting the number of servers in the standby state being less than the predetermined number;

backing up backup data of a master server to a preset data storage area, wherein the backup data comprises operation data and status data of the master server;

monitoring the master server for providing a service in the server cluster; and selecting a server from the servers in the standby state as a second master server, establishing communication connection from, the selected server to the preset data storage area, and backing up the backup data of the master server in the preset data storage area to the selected server, for the selected server to continue to provide the service, in response to detecting the master server being abnormal, wherein the selecting a server from the servers in the standby state as a second master server to continue to provide the service, in response to detecting the master server being abnormal comprises:

extracting registration information of the servers in the standby state from a registration information table, the registration information comprising serial number information of the servers in the standby state; and selecting one server from the servers in the standby state as the second master server to continue to provide the service according to values of serial numbers in the serial number information.

9. The apparatus according to claim 8, wherein the detecting a number of servers in a standby state in the server cluster comprises:

acquiring status information of each server in the server cluster;

determining whether the each server is in the standby state based on the status information of the each server; and counting and determining the number of servers in the standby state.

10. The apparatus according to claim 9, wherein the status information comprises heartbeat information; and the determining whether each server is in the standby state according to the status information of each server comprises:

sending a heartbeat information detection instruction to the each server in the server cluster; and determining whether the each server is in the standby state, based on receipt of the heartbeat information from the server within a preset period.

11. The apparatus according to claim 8, wherein the starting at least one server in the server cluster so that the number of servers in the standby state reaches a predetermined number, in response to detecting the number of servers in the standby state being less than the predetermined number comprises:

starting the at least one server in the server cluster based on a difference between the number of servers in the standby state and the predetermined number so that the number of servers in the standby state in the server cluster is equal to the predetermined number;

acquiring information of each server in the at least one server; and sequentially registering information of each started server as the registration information of the each started server in a preset registration information table.

12. The apparatus according to claim 8, wherein the selecting one server from the servers in the standby state as the second master server to continue to provide the service further comprises:

establishing communication connection from the selected server to a service node, the service node being a device interacting with the master server and controlled by the master server; and using the selected server as the second master server to continue to provide the service.

13. A non-transitory computer storage medium storing a computer program, which when executed by a processor, cause the processor to perform a method for switching between servers in a server cluster, the server cluster comprising at least one server for implementing a given service, the method comprising:

detecting a number of servers in a standby state in the server cluster;

starting at least one server in the server cluster so that the number of servers in the standby state reaches a predetermined number, in response to detecting the number of servers in the standby state being less than the predetermined number;

backing up backup data of a master server to a preset data storage area, wherein the backup data comprises operation data and status data of the master server;

monitoring the master server for providing a service in the server cluster; and selecting a server from the servers in the standby state as a second master server, establishing communication connection from the selected server to the preset data storage area, and backing up the backup data of the master server in the preset data storage area to the selected server, for the selected server to continue to provide the service, in response to detecting the master server being abnormal, wherein the selecting a server from the servers in the standby state as a second master server to continue to provide the service, in response to detecting the master server being abnormal comprises:

extracting registration information of the servers in the standby state from a registration information table, the registration information comprising serial number information of the servers in the standby state; and selecting one server from the servers in the standby state as the second master server to continue to provide the service according to values of serial numbers in the serial number information.

14. The non-transitory computer storage medium according to claim 13, wherein the detecting a number of servers in a standby state in the server cluster comprises;
  acquiring status information of each server in the server cluster;
  determining whether each server is in the standby state according to the status information of each server; and
  counting and determining the number of servers in the standby state.

15. The non-transitory computer storage medium according to claim 14, wherein the status information, comprises heartbeat information; and
  the determining whether each sever is in the standby state according to the status information of each server comprises:
  sending a heartbeat information detection instruction to each server in the server cluster; and
  determining whether a server is in the standby state, according to whether heartbeat information of the server is received within a preset period.

16. The non-transitory computer storage medium according to claim 13, wherein the starting at least one server in the server cluster so that the number of servers in the standby state reaches a predetermined number, in response to detecting the number of servers in the standby state being less than the predetermined number comprises:
  starting at least one server in the server cluster according to a difference between the number of servers in the standby state and the predetermined number so that the number of servers in the standby state in the server cluster is equal to the predetermined number;
  acquiring information of each server in the at least one server; and
  sequentially registering the information of each started server as the registration information of the server in a preset registration information table.

17. The non-transitory computer storage medium according to claim 13, wherein the selecting one server from the servers in the standby state as the second master server to continue to provide the service further comprises:
  establishing communication connection from the selected server to a service node, the service node being a device interacting with the master server and controlled by the master server; and
  using the selected server as the second master server to continue to provide the service.

* * * * *